United States Patent [19]

Schubart et al.

[11] 4,125,512

[45] Nov. 14, 1978

[54] PROCESS FOR THE PRODUCTION OF A STORABLE, SCORCH-RESISTANT RUBBER/FABRIC BONDING AGENT COMBINATION

[75] Inventors: Rüdiger Schubart, Cologne; Klaus-Dieter Albrecht, Leverkusen, both of Germany

[73] Assignee: Bayer Aktiengesellschaft, Leverkusen-Bayerwerk, Germany

[21] Appl. No.: 819,007

[22] Filed: Jul. 26, 1977

[30] Foreign Application Priority Data

Jul. 29, 1976 [DE] Fed. Rep. of Germany ....... 2634034

[51] Int. Cl.$^2$ .......................... C08G 8/22; C08K 3/34
[52] U.S. Cl. .................................... 260/42.14; 260/38; 260/42.37; 428/390; 428/394; 428/395

[58] Field of Search ............... 260/42.14, 42.15, 42.37; 428/390, 394, 395

[56] References Cited

U.S. PATENT DOCUMENTS

| | | | |
|---|---|---|---|
| 3,778,406 | 12/1973 | Klötzer et al. ................. | 260/42.14 X |
| 3,821,133 | 6/1974 | Doran et al. ................... | 260/42.14 X |
| 3,969,568 | 7/1976 | Sperley ............................ | 428/395 X |

*Primary Examiner*—Sandra M. Person
*Attorney, Agent, or Firm*—Connolly and Hutz

[57] ABSTRACT

A mixture comprising a resorcinol derivative, a formaldehyde donor, calcium silicate and a metal axide of the Second or Third Main Group of the Periodic System can be used for increasing the adhesion between rubber and textiles, glass or metals.

10 Claims, No Drawings

PROCESS FOR THE PRODUCTION OF A STORABLE, SCORCH-RESISTANT RUBBER/FABRIC BONDING AGENT COMBINATION

It is known from German Pat. Nos. 1,298,703; 1,301,475 and 1,297,853 that a bonding agent combination of resorcinol, a formaldehyde donor, such as hexamethylol melamine, and optionally a filler, such as, active silica with high surface activity, can be used to establish a bond between rubber and textile or steel cord. However, this bonding system has its limitations for some applications because the bonding mixtures have to be processed at temperatures at which the scorch resistance is too low. For example, it is not possible to produce bonding mixtures of this type in internal mixers in which temperatures of at least 120° C. are reached. Furthermore, it is frequently not possible to process mixtures of this type in extruders and calendars on account of the inadequate scorch resistance.

In addition, bonding mixtures which have been subjected to severe temperature stressing show a marked deterioration in the bond between the rubber and textile or between the rubber and steel cord.

It has now been found that a considerable increase in reliability in processing and an increase in the temperature limits can be obtained in the production of rubber mixtures of the type in question, providing a mixture consisting of a resorcinol derivative, a formaldehyde donor, calcium silicate and an oxide of the Second or Third Main Group of the Periodic System is added to the rubber mixtures to be applied to the textiles or to steel cord.

Accordingly, the present invention provides a mixture suitable for increasing the adhesion between rubber and textiles or metals, comprising:
 (a) A resorcinol derivative;
 (b) a formaldehyde donor;
 (c) calcium silicate; and
 (d) a metal oxide of the Second or Third Main Group of the Periodic System. The invention also provides a process for increasing the adhesion between rubber and textiles or metals by using the described mixture.

The composition of the mixture can be varied within wide limits. The only important factor is that an adhesion-increasing effect should be obtained when the mixture is used. The following global composition (in parts by weight) has proved to be appropriate:
 (a) from 15 to 45
 (b) from 10 to 40
 (c) from 60 to 14.5
 (d) from 15 to 0.5
The following mixture is particularly suitable:
 (a) from 20 to 35
 (b) from 15 to 30
 (c) from 52.5 to 32.5
 (d) from 12.5 to 2.5,
more especially:
 (a) from 27.5 to 33.0
 (b) from 17.5 to 24.0
 (c) from 43 to 35
 (d) from 12 to 8.

In addition to an improved scorch resistance of rubber mixtures, this mixture of resorcinol donor, formaldehyde donor, calcium silicate and an oxide of the Second or Third Main Group of the Periodic System also produces a strengthened rubber/textile or rubber/steel cord bond (higher modulus and hence increased crosslinking yield as well).

In contrast to the use of resorcinol, where mixing temperatures around the melting point (~ 120° C.) have to be reached in order to obtain effective distribution in the rubber mixture, the above-mentioned mixture may be effectively mixed in and distributed at much lower temperatures. Whereas, in cases where resorcinol is used, personnel are endangered and the atmosphere is polluted as a result of sublimation, these disadvantages do not arise where the above-mentioned mixtures are used. In addition, the resorcinol derivatives used in the mixtures according to the invention are far less dangerous to health by virtue of their low volatility. One particular advantage of the bonding system is its stability in storage. The mixture can be stored for prolonged periods (several months) at room temperature or even at slightly elevated temperatures (as encountered, for example, in tropical climates), without any deterioration in the adhesion properties after vulcanisation.

The mixture under discussion can be produced by mixing the individual components in any order in suitable mixing apparatus, for example internal mixers. The formaldehyde donor is preferably added last to the mixture. Mixing can be carried out at temperatures of from 20° C. to 80° C.

The following compounds for example can be used as the resorcinol derivatives:

1. Resorcinol esters corresponding to the formula:

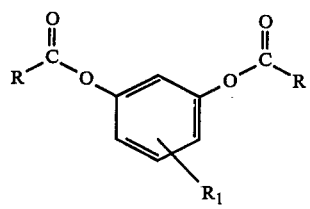

in which
R represents hydrogen; an optionally substituted straight-chain, branched-chain or cyclic, saturated or unsaturated alkyl radical; or an optionally substituted aryl radical, and
$R_1$ represents hydrogen, an alkyl radical with 1 to 6 carbon atoms or the group

where $R_2$ is hydrogen, a saturated or unsaturated alkyl group with 1 to 18 carbon atoms, phenyl or styryl.

In the substituent R, the alkyl groups preferably contain from 1 to 18 carbon atoms, whilst the aryl radicals preferably contain from 6 to 14 carbon atoms. These alkyl or aryl groups can optionally be substituted once or several times by the following groups: methyl, ethyl, n-propyl, isopropyl, n-butyl, isobutyl, sec.-butyl, tert.-butyl, n-pentyl, isopentyl, sec.-pentyl, n-hexyl, sec.-hexyl, tert.-hexyl, n-heptyl, sec.-heptyl, isoheptyl, n-octyl, sec.-octyl, tert.-octyl, n-nonyl, sec.-nonyl, isononyl, n-decyl, sec.-decyl, tert.-decyl, n-undecyl, sec.-undecyl, n-dodecyl, sec.-dodecyl, n-tridecyl, sec.-tridecyl, n-tetradecyl, sec.-tetradecyl, n-pentadecyl, sec.-pentadecyl, n-hexadecyl, sec.-hexadecyl, n-heptadecyl, sec.-heptadecyl, n-octadecyl, sec.-octadecyl, mercaptomethyl, hydroxymethyl, chloromethyl, cyano, carboxyl, hydroxyalkyl, alkyl mercapto, alkyloxy, hydroxy, mercapto, vinyl, allyl and isopropenyl.

The following are examples of the substituent $R_1$: hydrogen, methyl, ethyl, propyl, isopropyl, n-butyl, tert.-butyl, pentyl and hexyl.

The following are examples of the substituent $R_2$: hydrogen, methyl, ethyl, propyl, isopropyl and butyl, sec.-butyl, tert.-butyl, n-pentyl, sec.-pentyl, isopentyl, n-hexyl, sec.-hexyl, tert.-hexyl, n-heptyl, sec.-heptyl, n-octyl, sec.-octyl, tert.-octyl and nonyl, sec.-nonyl and decyl, sec.-decyl, n-undecyl, sec.-undecyl, n-dodecyl, sec.-dodecyl, n-tridecyl, sec.-tridecyl, n-tetradecyl, sec.-tetradecyl, n-pentadecyl, sec.-pentadecyl, n-hexadecyl, sec.-hexadecyl, n-heptadecyl, sec.-heptadecyl, n-octadecyl, sec.-octadecyl, vinyl, allyl, isopropenyl, phenyl and styryl.

The following compounds are mentioned by way of example: resorcinol diformate, resorcinol diacetate, resorcinol dipropionate, resorcinol-bis-butyric acid ester, resorcinol-bis-pentane carboxylic acid ester, resorcinol-bis-hexane carboxylic acid ester, resorcinol-bis-2-ethyl hexane carboxylic acid ester, resorcinol-bis-heptane carboxylic acid ester, resorcinol-bis-octane carboxylic acid ester, resorcinol-bis-nonane carboxylic acid ester, resorcinol-bis-decane carboxylic acid ester, resorcinol-bis-undecane carboxylic acid ester, resorcinol-bis-dodecane carboxylic acid ester, resorcinol-bis-tridecane carboxylic acid ester, resorcinol-bis-isobutyric acid ester, resorcinol-bis-tetradecane carboxylic acid ester, resorcinol-bis-pentadecane carboxylic acid ester, resorcinol-bis-hexadecane carboxylic acid ester, resorcinol-bis-heptadecane carboxylic acid ester, resorcinol-bis-octadecane carboxylic acid ester, resorcinol-bis-coconut oil fatty acid ester, resorcinol-bis-versatic acid ester, resorcinol-bis-acrylate, resorcinol-bis-methacrylate, resorcinol-bis-butadiene carboxylic acid ester, resorcinol-bis-crotonic acid ester, resorcinol-bis-muconate, resorcinol-bis-oleate, resorcinol-bis-oleic carboxylic acid ester, resorcinol-bis-acetoacetic ester, resorcinol-bis-cyclohexane carboxylic acid ester, resorcinol-bis-cyclohexylmethyl carboxylic acid ester, resorcinol-bis-benzoate, resorcinol-bis-o-methyl benzoate, resorcinol-bis-m-methyl benzoate, resorcinol-bis-p-methyl benzoate, resorcinol-bis-dimethyl benzoate, resorcinol-bis-methoxy carboxylic acid ester, resorcinol-bis-ethoxy carboxylic acid ester, resorcinol-bis-propoxy carboxylic acid ester, resorcinol-bis-butoxy carboxylic acid ester, resorcinol-bis-pentoxy carboxylic acid ester, resorcinol-bis-hexyloxy carboxylic acid ester, resorcinol-bis-heptoxy carboxylic acid ester, resorcinol octyloxy carboxylic acid ester, resorcinol-bis-nonyloxy carboxylic acid ester, resorcinol-bis-decyloxy carboxylic acid ester, resorcinol-bis-undecyloxy carboxylic acid ester, resorcinol-bis-dodecyloxy carboxylic acid ester, resorcinol-bis-tridecyloxy carboxylic acid ester, resorcinol-bis-tetradecyloxy carboxylic acid ester, resorcinol-bis-pentyl decyloxy carboxylic acid ester, resorcinol-bis-hexadecyloxy carboxylic acid ester, resorcinol-bis-heptadecyloxy carboxylic acid ester, resorcinol-bis-octadecyloxy carboxylic acid ester, resorcinol-bis-oxalocarboxylic acid polyester, resorcinol-bis-adipo-carboxylic acid polyester, resorcinol-bis-octane dicarboxylic acid polyester, resorcinol dodecane dicarboxylic acid polyester, resorcinol-bis-phthalic acid polyester, resorcinol-bis-isophthalic acid polyester, resorcinol-bis-terephthalic acid polyester, resorcinol-bis-cyclohexenyl carboxylic acid ester, resorcinol-bis-cyclohexadiene carboxylic acid ester, resorcinol-bis-phenyloxy carboxylic acid ester, resorcinol-bis-glutaric acid polyester, resorcinol-bis-hexane dicarboxylic acid polyester, also mixed resorcinol esters of mixtures of different commercial-grade acids which can be produced by azeotropic esterification and which, in addition, can be chemically very heterogeneous as a result of partial rearrangement (Fries' displacement).

(2) Resorcinol urethanes corresponding to the formula:

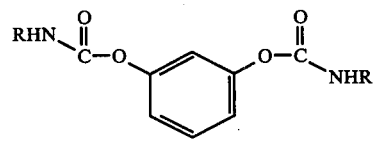

in which R represents an optionally substituted straight-chain, branched-chain, cyclic, saturated or unsaturated alkyl radical or an optionally substituted aryl radical.

The alkyl radical preferably contain from 1 to 15 carbon atoms. The aryl radicals contain from 6 to 14 carbon atoms and can optionally be substituted by: methyl, ethyl, n-propyl, isopropyl, n-butyl, sec.-butyl, isobutyl, tert.-butyl, n-pentyl, sec.-pentyl, isopentyl, n-hexyl, sec.-hexyl, tert.-hexyl, n-heptyl, sec.-heptyl, tert.-heptyl, n-octyl, sec.-octyl, tert.-octyl, n-nonyl, sec.-nonyl, tert.-nonyl, n-decyl, sec.-decyl, tert.-decyl, n-undecyl, sec.-undecyl, n-dodecyl, sec.-dodecyl, tert.-dodecyl, vinyl, isopropenyl, cyclohexyl, cyclohexyl methyl, methylene and dimethyl methylene.

The compounds can be obtained by reacting resorcinol with the corresponding monoisocyanates and polyisocyanates by methods known to the expert.

The following compounds are mentioned by way of example: resorcinol-bis-methyl urethane, resorcinol ethyl urethane, resorcinol-bis-propyl urethane, resorcinol-bis-butyl urethane, resorcinol-bis-pentyl urethane, resorcinol-bis-hexyl urethane, resorcinol-bis-heptyl urethane, resorcinol-bis-octyl urethane, resorcinol-bis-nonyl urethane, resorcinol-bis-decyl urethane, resorcinol-bis-undecyl urethane, resorcinol-bis-dodecyl urethane, resorcinol-bis-tridecyl urethane, resorcinol-bis-tetradeycl urethane, resorcinol-bis-pentadecyl urethane, resorcinol-bis-hexadecyl urethane, resorcinol-bis-heptadecyl urethane, resorcinol-bis-octadecyl urethane, resorcinol-bis-hexamethylene polyurethane, resorcinol-bis-tetramethylene polyurethane, resorcinol-bis-cyclohexyl urethane, resorcinol-bis-isopropenyl phenyl urethane, resorcinol-bis-vinyl phenyl urethane, resorcinol-bis-allyl phenyl urethane, resorcinol-bis-1,5-naphthalene polyurethane, resorcinol-bis-phenyl urethane, resorcinol-bis-o-methyl phenyl urethane, resorcinol-bis-m-methyl phenyl urethane, resorcinol-bis-p-methyl phenyl urethane, resorcinol-bis-2,4-tolylene polyurethane, resorcinol-bis-2,6-tolylene polyurethane, resorcinol-bis-4,4'-diphenyl methane polyurethane, resorcinol-bis-4,4'-diphenyl propyl polyurethane, resorcinol-bis-2,6-diisopropyl phenyl urethane, resorcinol-bis-4-methyl isocyanatophenyl urethane, resorcinol-triisopropyl phenylene polyurethane, resorcinol urethanes of TDI distillation residue isocyanates.

(3) Resorcinol sulponic acid esters corresponding to the formula:

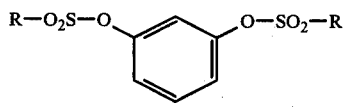

in which R represents a straight-chain, branched-chain or cyclic alkyl radical or an optionally substituted aryl radical. The alkyl radicals preferably contain from 1 to 18 carbon atoms. The aryl radicals contain from 6 to 14 carbon atoms and can optionally be substituted one or more times by: methyl, ethyl, n-propyl, isopropyl, n-butyl, sec.-butyl, isobutyl, tert.-butyl, n-pentyl, sec.-pentyl, isopentyl, n-hexyl, sec.-hexyl, tert.-hexyl, n-heptyl, sec.-heptyl, tert.-heptyl, n-octyl, sec.-octyl, tert.-octyl, n-nonyl, sec.-nonyl, tert.-nonyl, n-decyl, sec.-decyl, tert.-decyl, n-undecyl, sec.-undecyl, n-dodecyl, sec-dodecyl, n-tridecyl, sec.-tridecyl, n-tetradecyl, n-tetradecyl, n-pentadecyl, sec.-pentadecyl, n-hexadecyl, sec.-hexadecyl, n-heptadecyl, sec.-heptadecyl, n-octadecyl, sec.-octadecyl, and also by cyclohexyl, methyl cyclohexyl.

The compounds can be obtained by reacting resorcinol with the corresponding sulphonic acids by conventional methods.

The following compounds are mentioned by way of example: resorcinol-bis-methane sulphonic acid ester, resorcinol-bis-ethane sulphonic acid ester, resorcinol-bis-propane sulphonic acid ester, resorcinol-bis-butane sulphonic acid ester, resorcinol-bis-pentane sulphonic acid ester, resorcinol-bis-hexane sulphonic acid ester, resorcinol-bis-heptane sulphonic acid ester, resorcinol-bis-octane sulphonic acid ester, resorcinol-bis-nonane sulphonic acid ester, resorcinol-bis-decane sulphonic acid ester, resorcinol-bis-undecane sulphonic acid ester, resorcinol-bis-dodecane sulphonic acid ester, resorcinol-bis-tridecane sulphonic acid ester, resorcinol-bis-tetradecane sulphonic acid ester, resorcinol-bis-octadecane sulphonic acid ester, resorcinol-bis-phenyl sulphonic acid ester, resorcinol-bis-phenylene disulphonic acid polyester, resorcinol-bis-methyl phenyl sulphonic acid ester, resorcinol-bis-ethyl phenyl sulphonic acid ester, resorcinol-bis-propyl phenyl sulphonic acid ester, resorcinol-bis-butyl phenyl, sulphonic acid ester, resorcinol-bis-pentyl phenyl sulphonic acid ester, resorcinol-bis-hexyl phenyl sulphonic acid ester, resorcinol-bis-heptyl phenyl sulphonic acid ester, resorcinol-bis-octyl phenyl sulphonic acid ester, resorcinol-bis-nonyl phenyl sulphonic acid ester, resorcinol-bis-decyl phenyl sulphonic acid ester, resorcinol-bis-undecyl phenyl sulphonic acid ester, resorcinol-bis-dodecyl phenyl sulphonic acid ester, resorcinol-bis-tetradecyl phenyl sulphonic acid ester, resorcinol-bis-octadecyl phenyl sulphonic acid ester.

(4) Esterification products of resorcinol with phosphoric acid derivatives, thiophosphoric acid derivates and derivatives of the phosphorous acids corresponding to the formulae

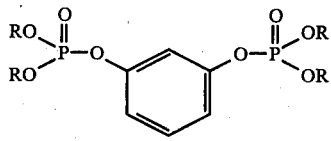

-continued

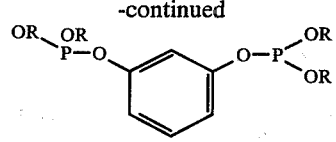

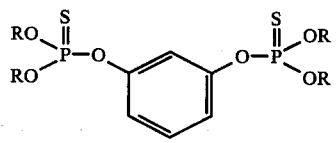

in which R represents a straight-chain or branched-chain alkyl radical with 1 to 8 carbon atoms or a phenyl radical.

The following compounds are mentioned as examples of R: methyl, ethyl, n-propyl, isopropyl, n-butyl, sec.-butyl, isobutyl, tert.-butyl, n-pentyl, sec.-pentyl, isopentyl, n-hexyl, sec.-hexyl, tert.-hexyl, n-heptyl, sec.-heptyl, tert.-heptyl, isoheptyl, n-octyl, sec.-octyl, tert.-octyl, 2-ethyl hexyl.

The following compounds are mentioned by way of example: resorcinol-bis-dimethyl phosphoric acid ester, resorcinol-bis-diethyl phosphoric acid ester, resorcinol-bis-dipropyl phosphoric acid ester, resorcinol-bis-dibutyl phosphoric acid ester, resorcinol-bis-dipentyl phosphoric acid ester, resorcinol-bis-dicyclohexyl phosphoric acid ester, resorcinol-bis-diphenyl phosphoric acid ester, resorcinol-bis-dimethyl thiophosphoric acid ester, resorcinol-bis-diethyl thiophosphoric acid ester, resorcinol-bis-dipropyl thiophosphoric acid ester, resorcinol-bis-dibutyl thiophosphoric acid ester, resorcinol-bis-dihexyl thiophosphoric acid ester, resorcinol-bis-dicyclohexyl thiophosphoric acid ester, resorcinol-bis-diphenyl thiophosphoric acid ester, resorcinol-bis-dimethyl phosphite, resorcinol-bis-diethyl phosphite, resorcinol-bis-dipropyl phosphite, resorcinol-bis-diphenyl phosphite.

In addition, R can be bridged in all three types of compounds; accordingly, derivatives of ethylene glycol or substituted ethylene glycols and homologous higher diols can be incorporated.

(5) Resorcinol silyl ethers

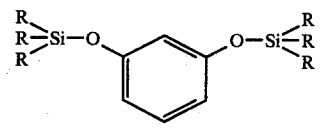

The bis-silyl ether or resorcinol-bis-trimethyl silyl ether can be used as the silyl ether; homologous higher derivatives are also suitable. Polysilyl ethers, such as resorcinol-bis-dimethyl silyl polyether can also be used.

The compounds are obtained by reacting resorcinol with trialkyl (or triphenyl) chlorosilane in an organic solvent, for example toluene, xylene, chlorobenzene, dichloromethane or chloroform, at room temperature in the presence of a tertiary amine, such as triethylamine or pyridine.

(6) Reaction products of resorcinol with phosgene corresponding to the formula:

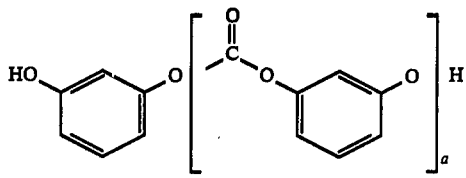

in which a may assume a value from 1 to 7.

The following compounds are mentioned by way of example;

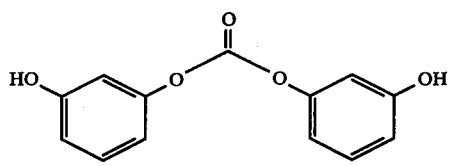

m.p. 83 – 87°

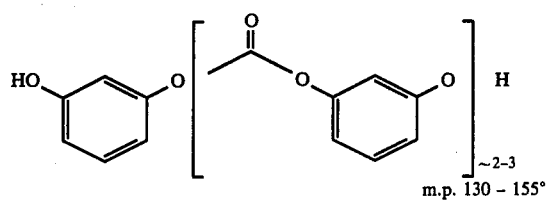

m.p. 130 – 155°

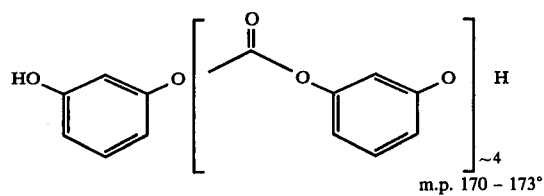

m.p. 170 – 173°

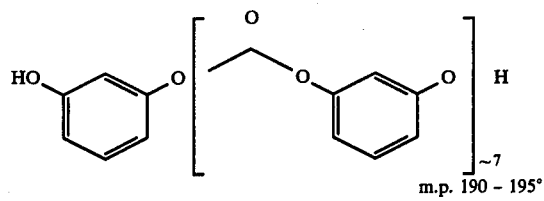

m.p. 190 – 195°

The free terminal OH-groups can, in addition, be etherified, esterified or urethanised.

The compounds can be obtained by reacting resorcinol with phosgene at temperatures of from 0° to 50° C. in aqueous or organic solvents, such as chlorobenzene or methylene chloride, in the presence of bases.

The optional further reaction of the free OH-groups can be carried out by conventional methods.

(7) Resorcinol ethers corresponding to the formula

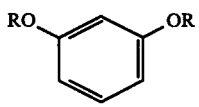

in which R represents optionally substituted alkyl, cycloalkyl or aralkyl groups. The alkyl radical preferably contains from 1 to 6 carbon atoms, the cycloalkyl radical preferably contain from 5 to 7 carbon atoms and the aralkyl radical preferably contains from 1 to 3 carbon atoms in the alkyl moiety and 6 carbon atoms in the aryl moiety. The preferred substituent is the hydroxy group.

The following are mentioned as examples of R: methyl, ethyl, n-propyl, isopropyl, n-butyl, isobutyl, sec.-butyl, tert.-butyl, n-pentyl, isopentyl, n-hexyl, sec.-hexyl, tert.-hexyl, cyclohexyl, benzyl, allyl, methallyl, hydroxyalkyl ($C_1$–$C_3$), hydroxycyclohexyl.

The following compounds are mentioned by way of example: resorcinol dimethyl ether, resorcinol diethyl ether, resorcinol-di-n-propyl ether, resorcinol-di-n-isopropyl ether, resorcinol-di-n-butyl ether, resorcinol-di-sec.-butyl ether, resorcinol-diisobutyl ether, resorcinol-di-tert.-butyl ether, resorcinol-di-n-pentyl ether, resorcinol-diisopentyl ether, resorcinol-di-n-hexyl ether, resorcinol-di-dec.-hexyl ether, resorcinol-di-tert.-hexyl ether, resorcinol-dicyclohexyl ether, resorcinol-dibenzyl ether, resorcinol-diallyl ether, resorcinol-dimethallyl ether, resorcinol-dihydroxyalkyl ether.

The formaldehyde donors normally used in the rubber industry, such as hexamethylol melamine, and ethers thereof, for example methyl ethers (mixtures of penta- and hexa-methyl ether) and esters, for example hexa-acetate and hexamethylene tetramine, can be used with the above-mentioned resorcinol donors. Other readily obtainable products derived from urea, thiourea and amides can also be used. Condensation products of formaldehyde and an amine, such as N-alkylperhydrotriazine, are also suitable formaldehyde donors.

Compounds such as these are described in detail in German Pat. Nos. 1,301,475; 1,298,703 and 1,297,853. Reference is hereby made to these Patent Specifications.

The following are mentioned as examples of metal oxides of the Second and Third main group of the Periodic System: magnesium oxide, strontium oxide, barium oxide, calcium oxide, basic aluminium oxide and boron trioxide.

Magnesium oxide has proved to be particularly suitable.

By means of the mixture according to the invention, it is possible to increase adhesion between rubber and textiles or metals.

Examples of rubbers are natural and synthetic rubber and also copolymers of ethylene-propylene (with a third component, such as dicyclopentadiene, ethylidene norbornene, 1,4-hexadiene) (EPDM rubber). It is also possible to use polyisoprene, polybutadiene, polypentenamer and, in particular polychloroprene and also their blends. The following are mentioned as examples of types: NR (SMR-I), SBR (Buna Huls 1300), BR (Buna CB 11), TPR (Polypentenamer), NBR (Perbunan N 2807 NS), CR (Baypren 110), IR (Natsyn 2200), EPDM (Buna AP 451).

However, the main field of application would appear to be in the polychloroprene sector because in that case the vulcanisation behavior of the mixture as a whole is influenced in particular by free resorcinol.

Suitable textiles are, for example, filaments (especially cord filaments) and also fabrics woven and knitted from such fibres as rayon, polyamide, polyester, polyacrylonitrile, cotton and aramides. It is also possible to use glass. Suitable metals are the zinc-plated and brass-plated steel cords normally used in the rubber industry.

In order to increase the strength of the above-mentioned bonds, the mixture according to the invention is best added in quantities of from 2 to 25 parts by weight, preferably in quantities of from 5 to 15 parts by weight, and more especially, in quantities of from 7.5 to 12.5 parts by weight per 100 parts by weight of rubber.

In cases where the filaments have to be pre-impregnated, pre-impregnation can be carried out in the usual way by treatment with latices based on natural rubber, butadiene-styrene, butadiene-acrylonitrile-chlorobutadiene, butadiene-styrene-vinyl pyridine copolymers or blends thereof and, preferably, resorcinol-formaldehyde resins.

The mixture according to the invention can be effectively worked into the rubber by means of any suitable mixing apparatus, such as rolls or internal mixers. However, it is also possible, instead of adding the already premixed 4-component mixture, to add the constituents either individually or in the form of corresponding 2-component or 3-component premixes. In one preferred variant, the formaldehyde donor is the last component of the mixture to be added.

EXAMPLE 1

Using laboratory mixing rolls, the following rubber mixture was prepared at a roll temperature of 40° C.:

|  | A | B | C |
|---|---|---|---|
| Polychloroprene | 100 | 100 | 100 |
| Active silica | 30 | 30 | 30 |
| Magnesium oxide | 4 | 3.2 | 2.75 |
| Resorcinol/stearic acid (2:1) | 3.4 | — | — |
| Resorcinol diacetate, Ca-silicate, MgO (4:3.2:0.8) | — | 8 | — |
| Resorcinol diacetate, Ca-silicate, MgO hexamethylol melamine Pentamethyl ether (4:5.04:1.26:2.3) | — | — | 12.6 |
| Zinc oxide | 5 | 5 | 5 |
| Stearic acid | 0.4 | 1.5 | 1.5 |
| Phenyl-α-naphthylamine | 2 | 2 | 2 |
| Aromat. polyether | 4 | 4 | 4 |
| Methylene-bis-thioglycolic acid butyl ester | 5 | 5 | 5 |
| Di-orthotolyl guanidine | 1 | 1 | 1 |
| Tetramethyl thiuram monosulphide | 1 | 1 | 1 |
| Sulphur | 0.5 | 0.5 | 0.5 |
| Hexamethylol melamine pentamethyl ether | 2.3 | 2.3 | — |
| The scorch resistance of the polychloroprene mixture was tested at 120° C in accordance with DIN 53 542: Mooney-Scorch [120° (mins)] | 13 | 21 | 21 |

Bond strength was tested by the method described in Bayer-Mitteilungen für die Gummi-Industrie 29 (1961), 67, using non-pretreated rayon (dtex 1840/2), polyamide (dtex 1880/2) and polyester (dtex 1100/3) cord. The adhesion values quoted represent the mean value of four individual measurements.

| Adhesion values (N/20 mm) | A | B | C |
|---|---|---|---|
| rayon | 143 | 157 | 149 |
| nylon | 216 | 229 | 204 |
| Polyester | 128 | 164 | 152 |

EXAMPLE 2

A natural rubber mixture was prepared and tested in the same manner as described in Example 1.

|  | A | B | C |
|---|---|---|---|
| Natural rubber | 100 | 100 | 100 |
| Carbon black (N 774) | 25 | 25 | 25 |
| Active silica | 15 | 15 | 15 |
| Resorcinol/stearic acid (2:1) | 3.4 | — | — |
| Resorcinol diacetate/calcium silicate/MgO (4:3.2:0.8) | — | 8 | — |
| Resorcinol/ca-silicate/MgO/ hexamethylol melamine pentamethyl ether (4/5.04/1.26/2.3) |  |  |  |
| Stearic acid | 0.4 | 1.5 | 1.5 |

-continued

|  | A | B | C |
|---|---|---|---|
| Zinc oxide | 5 | 5 | 5 |
| Mineral oil | 2 | 2 | 2 |
| Phenyl-α-naphthylamine | 1 | 1 | 1 |
| Cyclohexylbenzthiazole sulphenamide | 0.8 | 0.8 | 0.8 |
| Di-orthotolyl guanidine | 0.3 | 0.3 | 0.3 |
| Sulphur | 2.2 | 2.2 | 2.2 |
| Hexamethylol melamine pentamethyl ether | 2.3 | 2.3 | — |
| Mooney-Scorch up to 120° C (mins) | 33 | >45 | >45 |
| Adhesion values (N/20 mm) |  |  |  |
| rayon | 126 | 163 | 258 |
| nylon | 86 | 139 | 135 |
| polyester | 137 | 159 | 143 |

The combination of resorcinol and formaldehyde donor hitherto available on the market are not stable in storage and react quickly, depending upon the temperature conditions. By contrast, the combination of resorcinol derivatives, formaldehyde donor, Ca-silicate and magnesium oxide is extremely stable in storage.

The following tests demonstrate this behaviour. A solution of resorcinol in hexamethylol melamine pentamethyl ether was stored at 50° C. After only one day the product had reacted to form a solid resin and could no longer be used as a bonding agent.

By contrast, the mixture of resorcinol derivative, hexamethylol melamine pentamethyl ether, calcium silicate and magnesium oxide showed no changes detrimental to its activity, even after storage for 20 weeks at 50° C.

The material aged at 50° C. was tested with the following results in the recipe of Table I, mixture C:

| Ageing at 50° C | 0 | 1 | 2 | 3 | 4 | 8 | 12 | 20 weeks |
|---|---|---|---|---|---|---|---|---|
| Ms₅ 120° C | 24 | 28 | 25 | 32 | 25 | 27 | 30 | 27 |
| Adhesion (N/20 mm) |  |  |  |  |  |  |  |  |
| Rayon | 158 | 158 | 147 | 117 | 157 | 150 | 155 | 137 |
| Nylon | 233 | 207 | 206 | 203 | 193 | 198 | 213 | 215 |
| Polyester | 136 | 146 | 143 | 134 | 161 | 133 | 136 | 144 |

EXAMPLE 3

Three different carbonates with the following structure were tested:

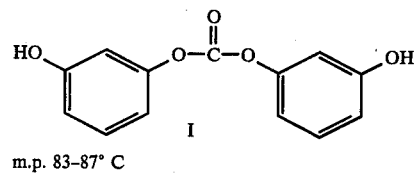

m.p. 83–87° C

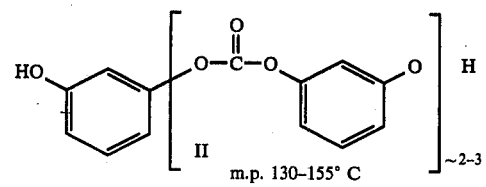

m.p. 130–155° C

-continued

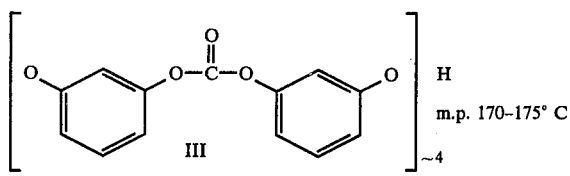

$$\begin{bmatrix} O & \overset{O}{\underset{\parallel}{\text{C}}} & O \\ O & -C & -O \end{bmatrix} H$$

III   m.p. 170–175° C   ~4

Table III

|  | A | B | C | D |
|---|---|---|---|---|
| Polychloroprene | 100 | 100 | 100 | 100 |
| Active silica | 30 | 30 | 30 | 30 |
| Magnesium oxide | 4 | 4 | 4 | 4 |
| Zinc oxide | 5 | 5 | 5 | 5 |
| Stearic acid | 0.4 | 1.5 | 1.5 | 1.5 |
| Phenyl-α-naphthylamine | 2 | 2 | 2 | 2 |
| Aromat. polyether | 4 | 4 | 4 | 4 |
| Methylene-bis-thioglycolic acid butyl ester | 5 | 5 | 5 | 5 |
| Di-orthotolyl guanidine | 1 | 1 | 1 | 1 |
| Tetramethyl thiuram monosulphide | 1 | 1 | 1 | 1 |
| Sulphur | 0.5 | 0.5 | 0.5 | 0.5 |
| Resorcinal/stearic acid (2:1) | 3.4 | — | — | — |
| Hexamethylol melamine pentamethyl ether | 2.3 | 2.3 | 2.3 | 2.3 |
| Compound I/Ca-silicate/MgO (2.3/1.84/0.46) | — | 4.6 | — | — |
| Compound II/Ca-silicate/MgO (2.3/1.84/0.46) | — | — | 4.6 | — |
| Compound III/Ca-silicate/MgO (2.3/1.84/0.46) | — | — | — | 4.6 |
| Mooney-Scorch up to 120° C (mins) | 12 | 16 | 13 | 15 |
| Adhesion values (N/20 mm) |  |  |  |  |
| rayon | 82 | 144 | 153 | 147 |
| nylon | 153 | 219 | 195 | 209 |
| polyester | 87 | 125 | 139 | 156 |

EXAMPLE 4

Testing of carbonates I to III in an NR-BR-blend for adhesion to brass plated steel cord (construction 7 × 3 × 0.15) produce the following results:

|  | A | B | C | D |
|---|---|---|---|---|
| Natural rubber | 60 | 60 | 60 | 60 |
| Polybutadiene | 40 | 40 | 40 | 40 |
| Active silica | 15 | 15 | 15 | 15 |
| Carbonblack | 35 | 35 | 35 | 35 |
| Zinc oxide | 6 | 6 | 6 | 6 |
| Resorcinol/stearic acid (2:1) | 3.4 | — | — | — |
| Stearic acid | — | 1.1 | 1.1 | 1.1 |
| Phenyl-β-naphthylamine | 1 | 1 | 1 | 1 |
| Aromat. mineral oil | 4 | 4 | 4 | 4 |
| Dicylohexylaminobenzthiazole sulphenamide | 0.7 | 0.7 | 0.7 | 0.7 |
| Sulphur | 4 | 4 | 4 | 4 |
| Abietic acid | 2 | 2 | 2 | 2 |
| Hexamethylol melamine pentamethyl ether | 2.3 | 2.3 | 2.3 | 2.3 |
| Compound I/Ca-silicate/MgO (2.3/1.84/0.46) | — | 4.6 | — | — |
| Compound II/Ca-silicate/MgO (2.3/1.84/0.46) | — | — | 4.6 | — |
| Compound III/Ca-silicate/MgO (2.3/1.84/0.46) | — | — | — | 4.6 |

Since in every case the Mooney-Scorch Values at 120° C. amount to more than 45 minutes, the $ts_{30}$-values at 150° C. from the vulkameter curves are quoted.

| $ts_{30}$ (mins.) at 150° C | 6.5 | 9.3 | 13.0 | 13.6 |
|---|---|---|---|---|
| Adhesion values (N/20 mm) |  |  |  |  |
| Steel cord (brass-plated) | 438 | 462 | 439 | 442 |

EXAMPLE 5

The urethane of resorcinol and methylene diphenyl diisocyanate produced the following scorch and adhesion values with brass-plated steel cord.

|  | A | B |
|---|---|---|
| Natural rubber | 60 | 60 |
| Polybutadiene | 40 | 40 |
| Active silica | 15 | 15 |
| Carbon black (HAF) | 35 | 35 |
| Zinc oxide | 6 | 6 |
| Resorcinol/stearic acid (2:1) | 3.4 | — |
| Stearic acid | — | 1.1 |
| Phenyl-β-naphthylamine | 1 | 1 |
| Aromat. mineral oil | 4 | 4 |
| Dicyclohexylaminobenzthiazole sulphenamide | 0.7 | 0.7 |
| Sulphur | 4 | 4 |
| Abietic acid | 2 | 2 |
| Hexamethylol melamine pentamethyl ether | 2.3 | 2.3 |
| Polyurethane of resorcinol/MDI/Ca-silicate/MgO | — | 9.8 |
| Mooney-Scorch at 120° C (mins.) | 38 | >45 |
| Adhesion values (N/20 mm) | 418 | 467 |

|  | A | B | C | D |
|---|---|---|---|---|
| Polychloroprene | 100 | 100 | 100 | 100 |
| Active silica | 30 | 30 | 30 | 30 |
| MgO | 4 | 4 | 4 | 4 |
| ZnO | 5 | 5 | 5 | 5 |
| Resorcincol/stearic acid (2:1) | 3.4 | — | — | — |
| Stearic acid | 0.3 | 1.4 | 1.4 | 1.4 |
| Phenyl-α-naphthylamine aromat. polyether | 4 | 4 | 4 | 4 |
| Methylene-bis-thioglycolic acid butyl ester | 5 | 5 | 5 | 5 |
| Di-orthotolyl guanidine | 1 | 1 | 1 | 1 |
| Tetramethyl thiuram monosulphide | 1 | 1 | 1 | 1 |
| Sulphur | 0.5 | 0.5 | 0.5 | 0.5 |
| Hexamethylol melamiine pentamethyl ether | 2.3 | 2.3 | 2.3 | 2.3 |
| Resorcinol-bis-2,4-tolylene polyurethane/Ca-silicate/MgO (50/40/10) | — | 12 | — | — |
| Resorciinol-bis-4-methyl isocyanatophenyl urethane/Ca-silicate/MgO (50/40/10) | — | — | 19.2 | — |
| Resorcinol-bis-o-methylphenyl urethane/Ca-silicate/MgO (50/40/10) | — | — | — | 15.5 |
| Mooney-Scorch 120° C (mins.) | 15 | 17 | 30 | 11 |
| Adhesion values (N/20 mm) |  |  |  |  |
| rayon | 153 | 148 | 151 | 140 |
| nylon | 120 225 | 176 | 188 |  |
| polyester | 126 | 179 | 166 | 155 |

EXAMPLE 6

Of the series of resorcinol ethers, the dimethyl ether is mentioned as an example.

|  | A | B |
|---|---|---|
| Polychloroprene | 100 | 100 |
| Magnesium oxide | 4 | 4 |
| Zinc oxide | 5 | 5 |
| Stearic acid | 1.5 | 1.5 |
| Phenyl-α-naphthylamine | 2 | 2 |
| Active silica | 30 | 30 |
| Aromat. polyether | 4 | 4 |
| Methylene-bis-thioglycolic acid butyl ester | 5 | 5 |
| Sulphur | 0.5 | 0.5 |
| Di-orthotolyl guanidine | 1 | 1 |
| Tetramethyl thiuram monosulphide | 1 | 1 |
| Resorcinol | 2.5 | — |
| Resorcinol dimethyl ether/Ca-silicate/MgO (3.15/2.46/0.61) | — | 6.3 |
| Hexamethylol melamine penta- |  |  |

-continued

|  | A | B |
|---|---|---|
| methyl ether | 2.5 | 2.5 |
| Mooney-Scorch at 120° C (mins.) | 8 | >45 |
| Adhesion values (N/20mm) | | |
| rayon | 105 | 117 |

EXAMPLE 7

Of the series of sulphonic acid derivatives of resorcinol, the diphenyl sulphone is mentioned as an Example.

|  | A | B |
|---|---|---|
| Polychloroprene | 100 | 100 |
| Active silica | 30 | 30 |
| Magnesium oxide | 4 | 4 |
| Zinc oxide | 5 | 5 |
| Resorcinol/stearic acid (2:1) | 3.4 | — |
| Stearic acid | 0.3 | 1.4 |
| Phenyl-α-naphthylamine | 2 | 2 |
| aromat. polyether | 4 | 4 |
| Methylene-bis-thioglycolic acid butyl ester | 5 | 5 |
| Di-orthotolyl guanidine | 1 | 1 |
| Tetramethyl thiuram monosulphide | 1 | 1 |
| Sulphur | 0.5 | 0.5 |
| Hexamethylol melamine pentamethyl ether | 2.3 | 2.3 |
| Resorcinol-bis-phenyl sulphonic acid ester/Ca-silicate/MgO (50/40/10) | — | 16.2 |
| Mooney-Scorch at 120° C (mins.) | 15 | >45 |
| Adhesion values (N/20 mm) | | |
| rayon | 153 | 155 |
| nylon | 120 | 181 |
| polyester | 126 | 128 |

EXAMPLE 8

Of the resorcinol silyl ethers, resorcinol-bis-trimethyl silyl ether is mentioned as an example. Polychloroprene recipe of Example 7.

|  | A | B |
|---|---|---|
| Resorcinol-bis-[trimethyl-silylethyl]/Ca-silicate/MgO (50/40/10) | — | 10.6 |
| Mooney-Scorch at 120° C (mins.) | 10 | 13 |
| Adhesion values (N/20 mm) | | |
| rayon | 154 | 150 |
| nylon | 118 | 217 |
| polyester | 146 | 147 |

We claim:
1. A mixture consisting of
   (a) a resorcinol donor which substantially lowers the mixing temperature with rubber to thereby avoid sublimation and pollution difficulties,
   (b) a formaldehyde donor,
   (c) calcium silicate and
   (d) a metal oxide of Group IIa or IIIa of the Periodic System.
2. A mixture as claimed in claim 1, consisting of
   (a) 15 to 40 parts by weight of a resorcinol donor which substantially lowers the mixing temperature with rubber to thereby avoid sublimation and pollution difficulties,
   (b) 10 to 40 parts by weight of a formaldehyde donor,
   (c) 60 to 14.5 parts by weight of a calcium silicate and
   (d) 15 to 0.5 parts by weight of metal oxide of Group IIa or IIIa of the Periodic System.
3. A process for producing the mixture claimed in claim 1, wherein the individual components are mixed in any order in suitable mixing apparatus.
4. A process as claimed in claim 3, wherein the formaldehyde donor is added last.
5. A process as claimed in claim 3, wherein mixing is carried out at temperatures in the range from 20° to 80° C.
6. The use of the mixture claimed in claim 1 for increasing adhesion between rubber and textiles or metals.
7. The use of the mixture as claimed in claim 6 in quantities of from 2 to 25 parts by weight per 100 parts by weight of rubber.
8. A process for increasing adhesion between rubber and textiles or metals, wherein a resorcinol donor which substantially lowers the mixing temperature with rubber to thereby avoid sublimation and pollution difficulties, a formaldehyde donor, calcium silicate and a metal oxide of Group IIa or IIIa of the Periodic System are added to the rubber together or individually.
9. A process as claimed in claim 8, wherein the formaldehyde donor is added last to the rubber.
10. A mixture containing rubber reinforced with textiles or metals and a resorcinol donor which substantially lowers the mixing temperature with rubber to thereby avoid sublimation and pollution difficulties, a formaldehyde donor, calcium silicate and a metal oxide of Group IIa or IIIa of the Periodic System.

* * * * *